Patented May 19, 1931

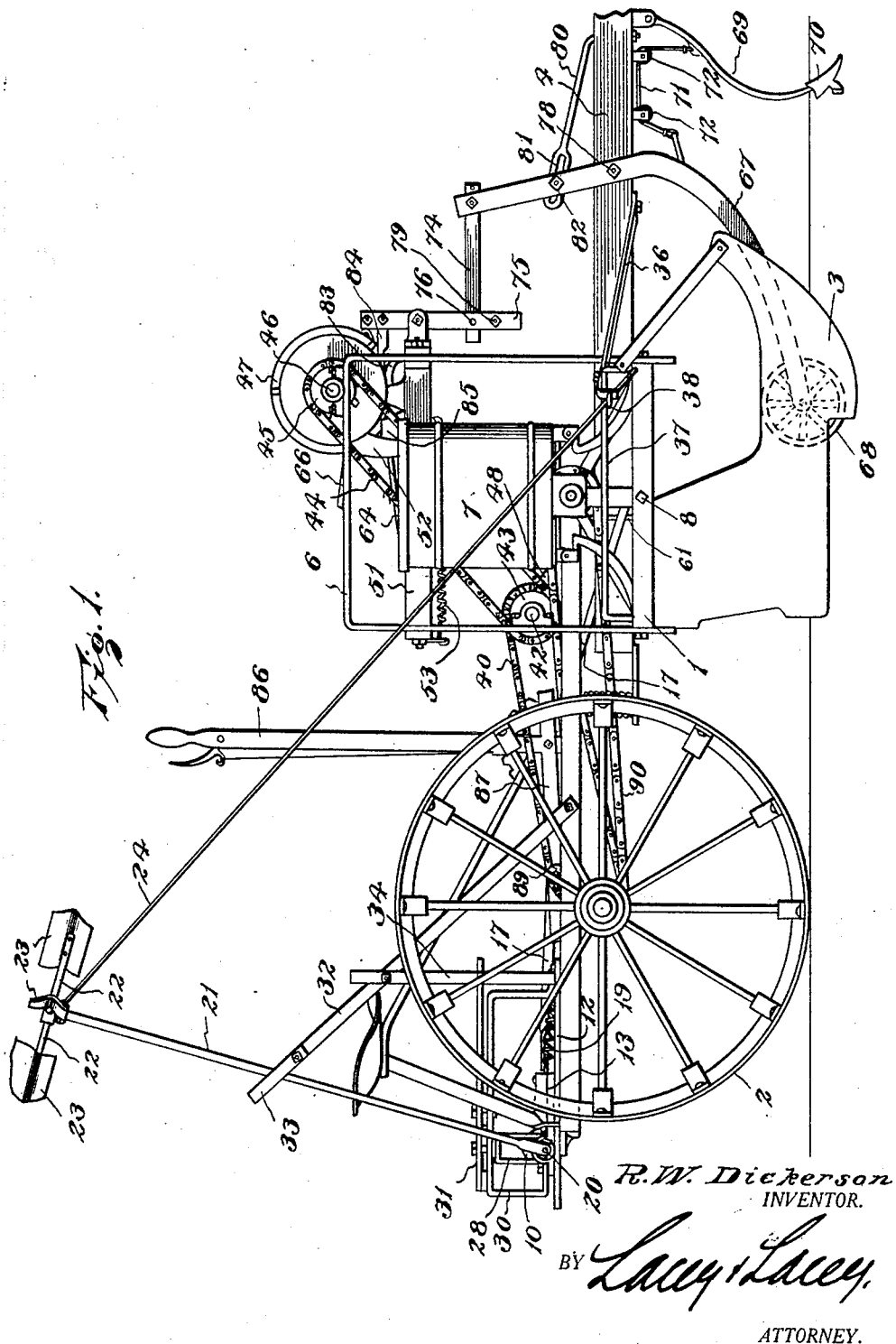

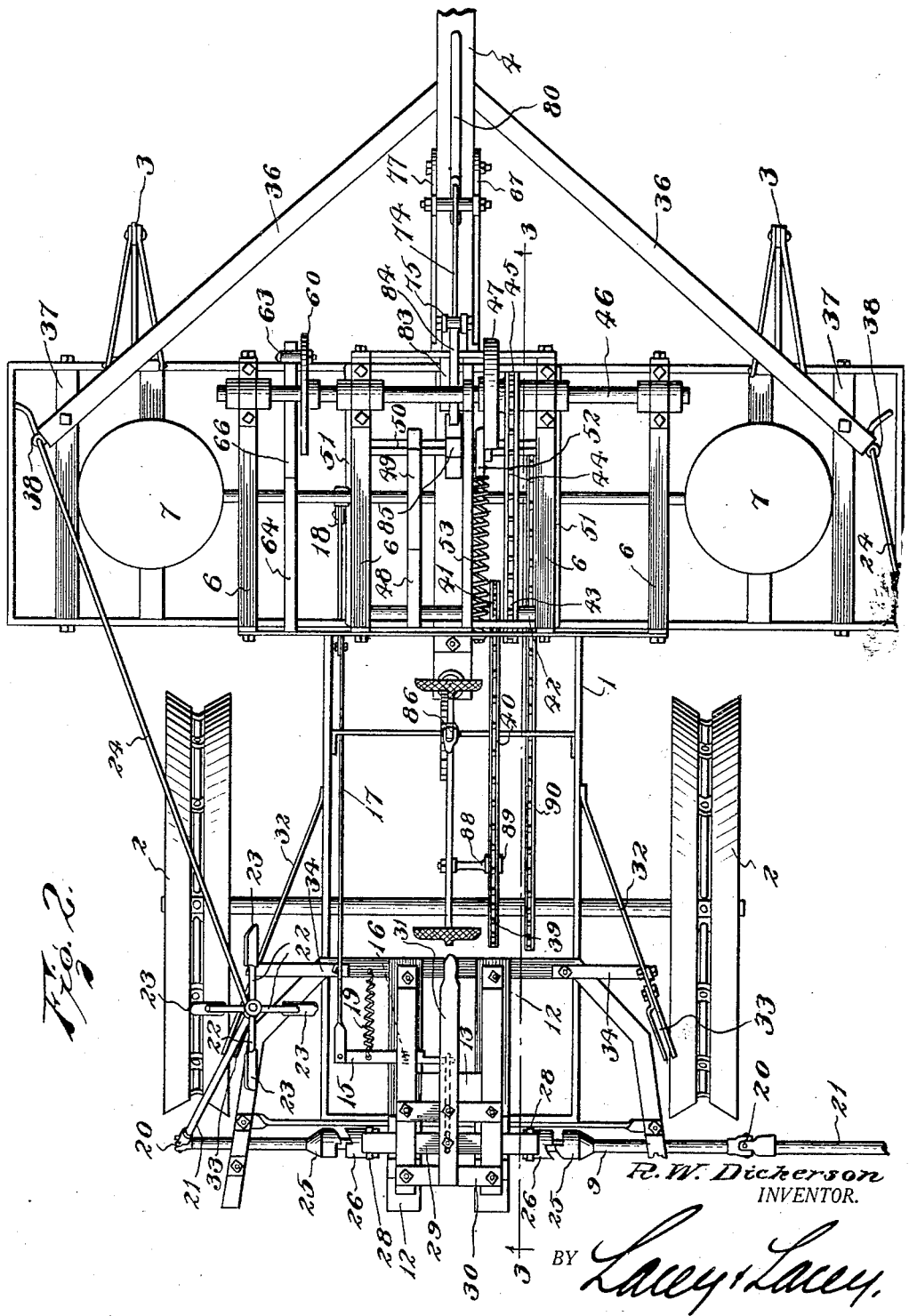

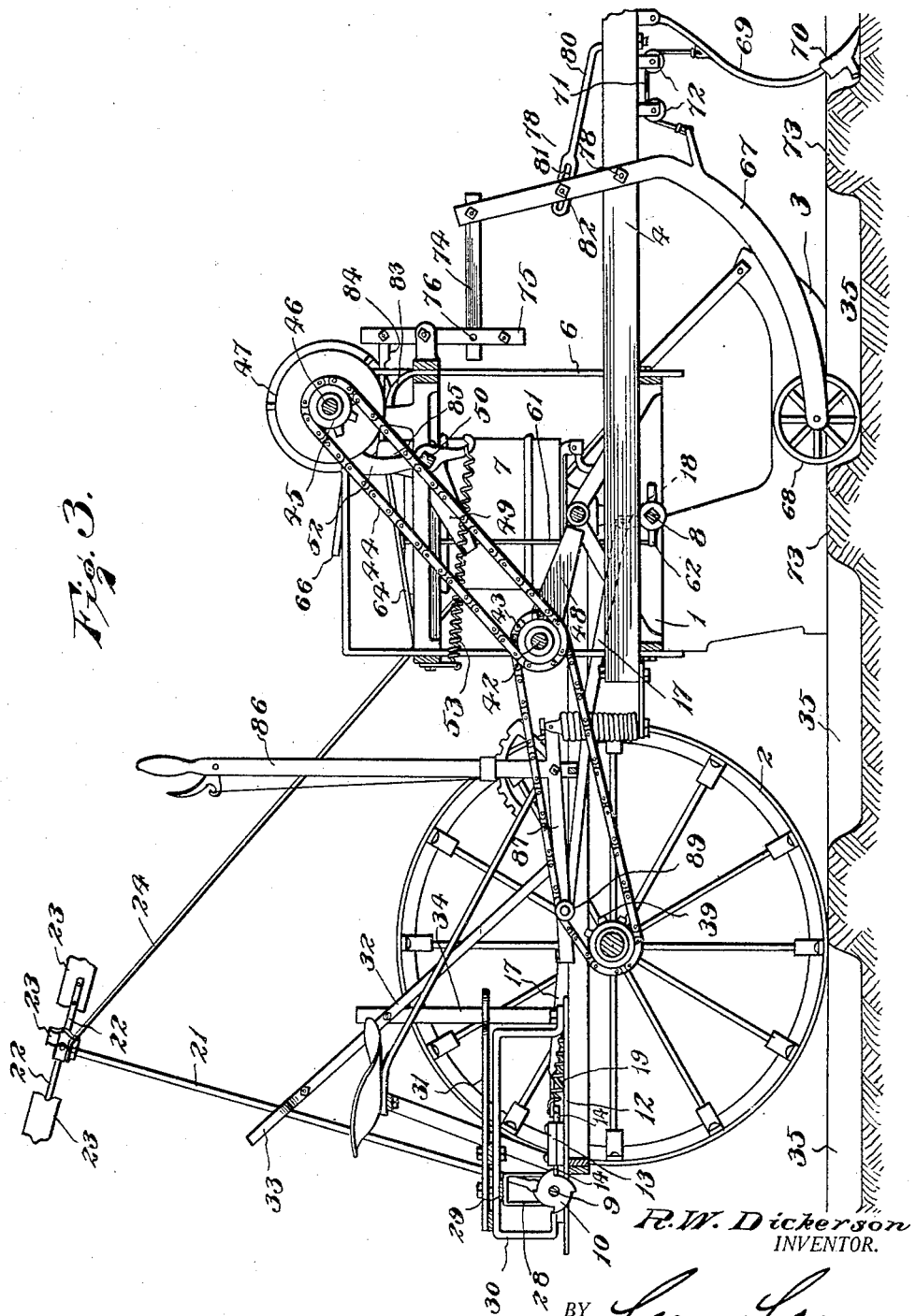

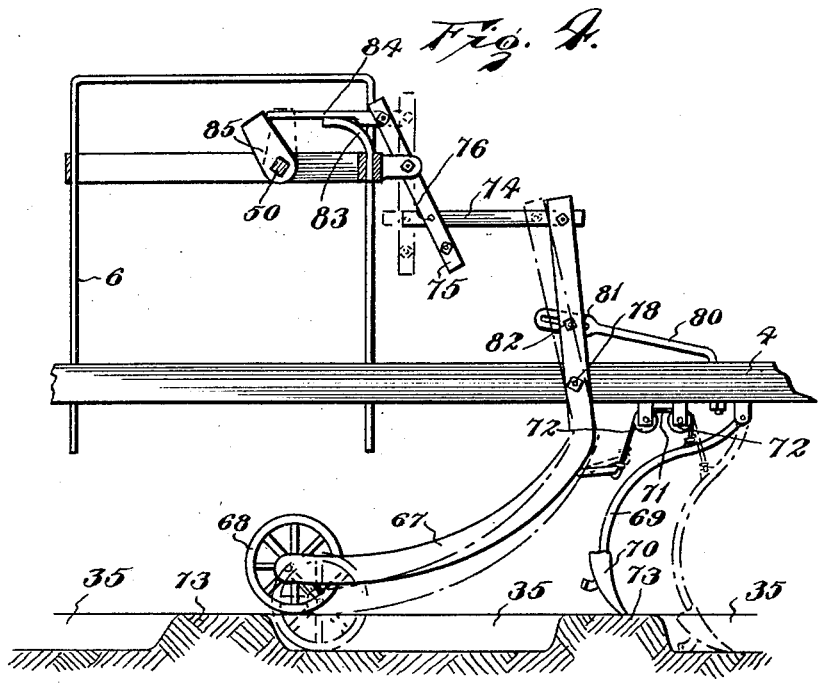
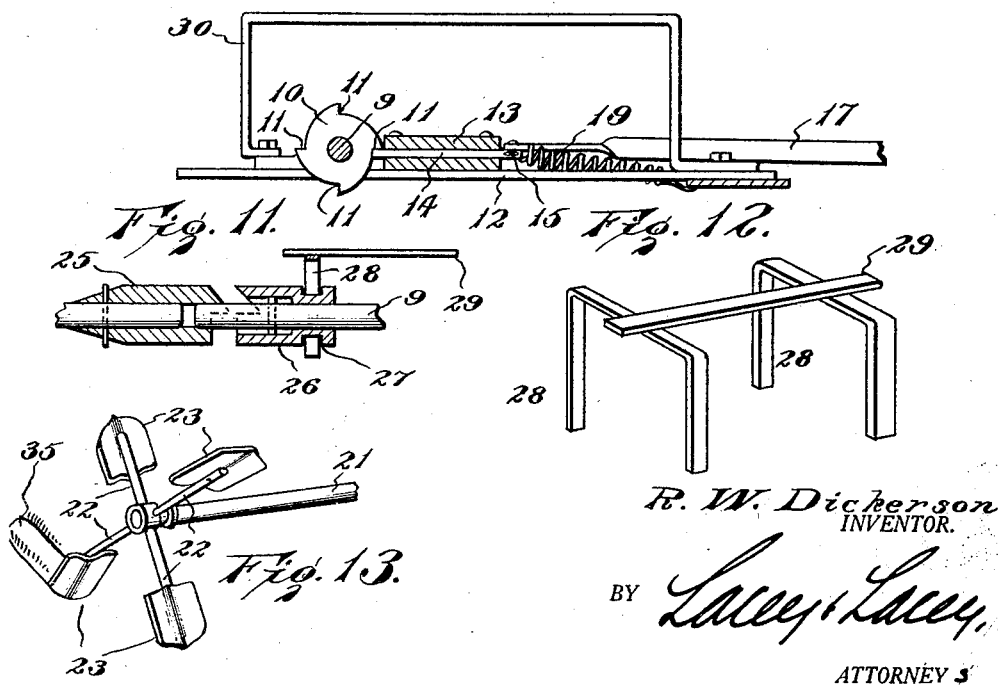

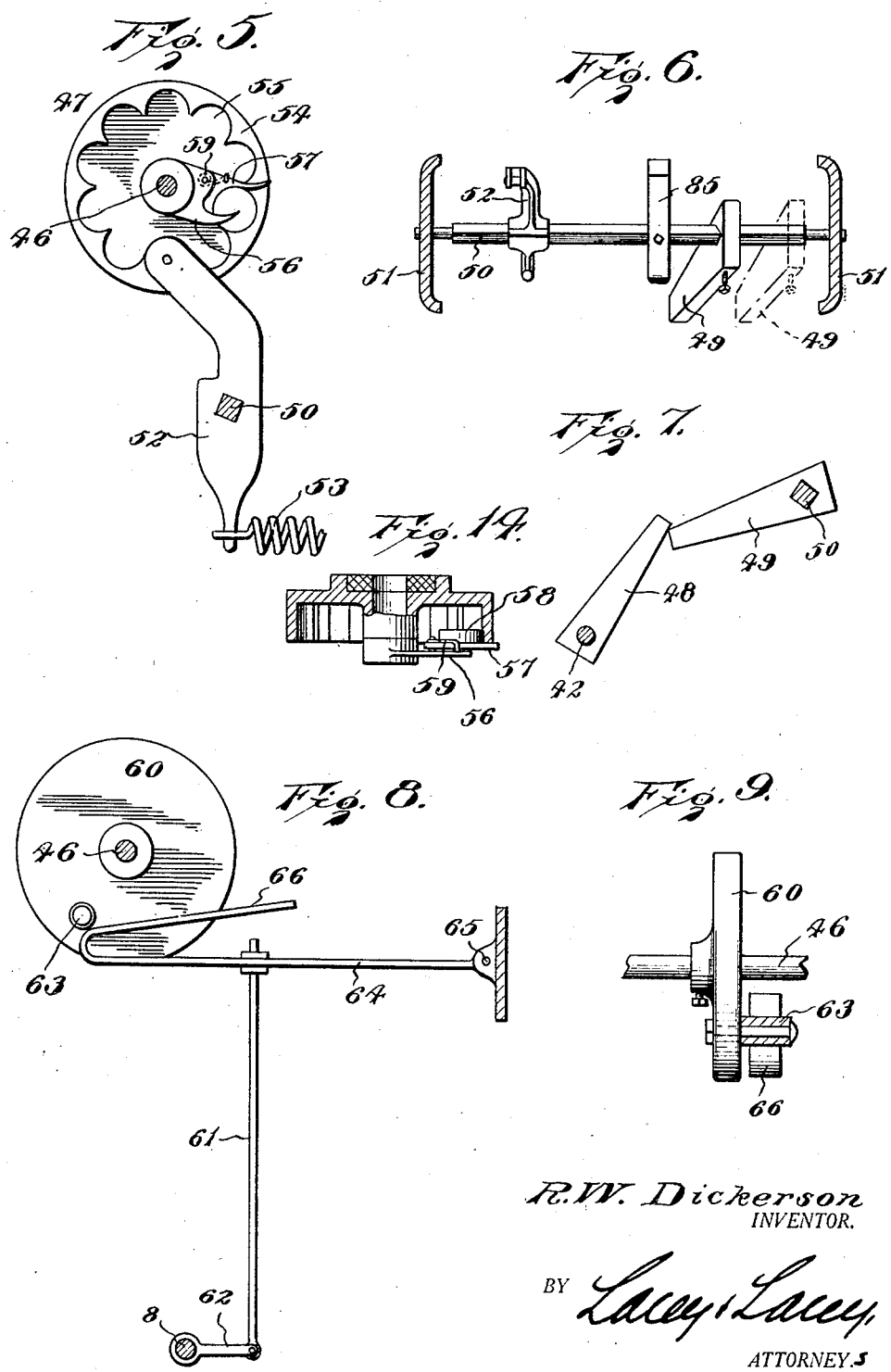

1,806,389

UNITED STATES PATENT OFFICE

RALPH W. DICKERSON, OF ROSCOE, OHIO

PLANTER

Application filed November 14, 1929. Serial No. 407,212.

This invention seeks to provide a simple mechanism which may be mounted upon a corn planter and effect an even spacing of the hills in planting without the use of the expensive, cumbersome and generally unsatisfactory check row wire. The invention has for its object the provision of mechanism whereby, during the planting of the first row of hills, the spacing of the hills will be accurately located, and the indications which locate the spots where subsequent hills should be planted will be thereafter utilized to actuate the seed-dropping mechanism. The invention is illustrated in the accompanying drawings and will be hereinafter fully set forth and defined.

In the drawings:

Figure 1 is a side elevation of a planter having the present invention embodied therein, parts of the planter mechanism being omitted for the sake of clearness, Fig. 2 is a plan view of the same, Fig. 3 is a longitudinal section about on the line 3—3 of Fig. 2, Fig 4 is a detail elevation of the actuating devices adapted to run in the trenches defined by the markers for controlling the seed-dropping mechanism, and Figs. 5 to 14 inclusive are detail views of various operating elements.

The frame 1 of the planter is of the usual general formation and is supported upon ground wheels 2 and plows 3, a tongue 4 being secured to and projecting forwardly from the main frame to be coupled to a tractor or permit the machine to be drawn by draft animals. Upon the cross bars constituting the front portion of the main frame are erected a plurality of arches 6 which provide supports for the principal operating mechanism, as will be hereinafter fully set forth, while seed boxes 7 are mounted upon the main frame and the dropping shaft 8, disposed transversely of the main frame, is connected with the seed-dropping devices in the usual manner to deposit the seed in the hills when it is operated by the mechanism which will be hereinafter described.

Upon the rear end of the main frame is mounted the marker shaft 9 and to said shaft, at the center thereof, is secured a stop wheel or disk 10 having shoulders 11 disposed across its periphery at regular intervals, four shoulders being illustrated in the present instance, as clearly shown in Figs. 3 and 10. Supported by frame members 12 in front of the stop disk 10 is a guide block 13 in which is slidably mounted a stop pin 14 which is adapted to engage the shoulder 11 presented thereto and thereby hold the disk against rotation. The pin 14 is connected at its front end with the inner end of a lever or rocking arm 15 which is disposed horizontally and transversely upon the frame and is pivoted between its ends, as at 16. To the outer end of the lever 15 is pivoted the rear end of a connecting rod 17 which extends forwardly and has its front end pivoted to a crank 18 on the dropper shaft 8. A retractile spring 19, attached to the lever at the outer side of its pivot and to the frame in front of the lever, hold the pin 14 in engagement with the disk 10. By this arrangement, whenever the dropper shaft is rocked motion will be imparted to the crank 18 to exert a pull through the intermediate elements upon the pin 14 to release the same from the stop disk so that the marker shaft may then make one quarter of a revolution, the end of the pin riding upon the periphery of the stop disk and automatically engaging the succeeding shoulder 11 under the influence of the spring 19 in an obvious manner.

Connected to each end of the marker shaft 9 by a universal joint, shown at 20, is a marker arm 21 and at the outer end of each arm 21 is secured a marking spider consisting of radial arms 22 and a plow 23 secured to the outer end of each radial arm or spoke. A brace 24 extends between the outer end of each marker arm 21 and the forward portion of the main frame so that the arm will be prevented from swinging backwardly when at work although the universal joint will permit it to be turned into an upright position when it is not at work. When either marker is lowered into the working position, see Fig 13, a plow 23 is caused to penetrate the ground and form a short trench, indicated at 35, parallel with the line of travel of the machine, the marker being held against rotation at this time by the engagement of the stop pin 14 with the stop disk 10. When the dropper shaft 8 is rocked to drop seed, the stop pin 14 is withdrawn, as previously explained, and the marker shaft will make a quarter turn so that the plow 23 which has been making a trench will be permitted to rise from the ground and simultaneously with such action the succeeding plow 23 will be brought into engagement with the ground, as will be understood upon reference to Fig. 13. The rotation of the marker is caused by the resistance offered by the soil to the forward movement of the plow, and, as the machine continues to move forward, the plow will be thereby caused to move out of the ground and impart the stated quarter turn to the marker and the marker shaft. The marker shaft consists of axially alined central and end members, as will be understood upon reference to Figs. 2 and 11, the stop disk being secured upon the central section. Upon each end member of the shaft is secured a half clutch 25 and upon each end portion of the central member is a clutch sleeve 26 which may slide endwise upon the shaft but is constrained to rotate therewith. Each clutch sleeve is arranged to mate with the adjacent half clutch 25. The clutch sleeves 26 are each provided with an annular groove 27 in which is engaged a fork or yoke 28 depending from an end of a connecting bar 29 which is disposed directly over the marker shaft and is slidably supported by the auxiliary frame 30. A hand lever 31 is fulcrumed on the auxiliary frame and extends forwardly, its rear end being operatively connected with the bar 29. By shifting the hand lever in the proper direction one clutch sleeve 26 will be caused to engage the mating clutch member 25 while at the opposite side the clutch members will be disengaged. If the lever be set parallel with the sides of the frame, as shown in Fig. 2, both clutches will be open and neither marker will operate.

Upon each side of the main frame there is secured a prop 32 having a fork 33 at its upper end and having its intermediate portion braced by posts 34. When either marker is inactive, its arm or shank rests in the fork of the adjacent prop so that it will be firmly held from falling as will be understood upon reference to Figs. 1, 2 and 3.

Braces 36 are secured to the tongue and diverge rearwardly therefrom to the main frame where they are secured to brackets 37. The front ends of the marker braces 24 are engaged in eyes 38 at the rear ends of the braces 36 so that when a marker is at work the pull will be taken by the tongue.

While the first row of hills is being planted, the rocking of the dropper shaft 8 is accomplished by power transmitted from the axle of the ground wheels 2 for which purpose the axle is equipped with a sprocket wheel 39, shown in Figs. 2 and 3, and a chain 40 is trained about said sprocket and about a sprocket wheel 41 secured upon a shaft 42 mounted upon the rear sides of intermediate arches 6. A second sprocket wheel 43 is secured upon the shaft 42 alongside the sprocket 41 and a chain 44 is trained around the sprocket 43 and a similar sprocket 45 which is loose upon a shaft 46 mounted upon the tops of the several arches 6. The sprocket 45 is loose upon the shaft 46 but is fixed to one side of a clutch drum 47 with which cooperates a clutch dog to be presently described. A knocker 48 is secured upon the shaft 42 which shaft operates continuously whenever the machine is in motion, and said knocker is disposed in the same longitudinal vertical plane with a similar knocker 49 upon a rock shaft 50 which is journaled in frame bars 51 secured upon the intermediate arches 6. As the knocker 48 moves around with the shaft 42, it will, once in each rotation, impinge upon and swing the knocker 49, thereby rocking the shaft 50. Said shaft 50 is arranged almost directly under the shaft 46 and a clutch dog 52 is secured upon the shaft 50, a spring 53, attached to the frame and to the lower end of the dog, returning the rock shaft 50 to normal position after each actuation. The parts are so proportioned that the shaft 42 makes one revolution while the machine travels three and one-half feet which is the standard spacing of planted hills. After the first row is planted, the knocker 49 is shifted to one side, as indicated by the dotted lines in Fig. 6, and the knocker 48 will then run idle.

The clutch drum 47 is constructed with a flange 54 on its side remote from the sprocket 45 and pockets 55 are provided through the entire extent of the concave surface of the flange. A clutch lever 56 is fixed to the shaft 46 and a pawl 57 is pivoted to the side of the lever adjacent the free end thereof, said pawl having a projection 58 on its side adapted to seat in any one of the pockets 55 and thereby lock the drum to the shaft whereupon the rotation of the drum will be imparted to the shaft and the seed-dropping mechanism will be actuated. A spring 59 urges the pawl to the flange 54 and the free end of the clutch dog extends into the path of the pawl so that as the drum completes a revolution the pawl will impinge against the end of the dog and be lifted out of engagement with the flange and held out of engagement until the rock shaft is again actuated and the dog thereby released from the pawl, whereupon the drum may make another revolution.

To actuate the seed-dropping shaft, a disk 60 is secured upon the shaft 46 and operates on the upper end of a rod 61 rising from a crank 62 on the dropper shaft, as indicated in Fig. 8. The disk is provided with an eccentric tappet 63 on one side, and a plate or arm 64 is secured to and extends across the upper end of the rod 61, the rear end of said arm being pivoted to a part of the frame, as indicated at 65 in Fig. 8, while the front end thereof is doubled on itself to form a free leaf 66 extending into the path of the tappet so that once in each revolution of the shaft 46 the tappet will ride on said leaf and depress the rod 61 to rock the dropper shaft 8.

After the first row of hills is planted, the dropping of seed is controlled by mechanism mounted on the tongue or steering pole 4. Pivoted to and extending above and below the tongue is a lever or rocking beam 67 which extends rearwardly below the tongue and is equipped with a roller 68 at its rear extremity, the beam being so formed that the roller may travel in the trenches 35 directly under the tongue. Pivoted on the under side of the tongue 4 in advance of the beam 67 is a standard or shank 69 fitted with a plow or scraper 70 at its lower end. This scraper and its standard or shank are disposed in the same longitudinal plane as the roller 68 so as to run in the trench 35 ahead of the trench in which the roller travels, and a cable 71 is attached at its forward end to the shank or standard 69 near the upper end thereof and passes over guide pulleys 72 mounted on the under side of the draft tongue to be attached to the front end of the beam 67, as shown in Figs. 1, 3 and 4.

The action of the marker is to form an interrupted trench or a series of alined short trenches separated by knolls 73 of earth, and the distance between the points of the marker plows 23 is the same as the distance between the point or tip of the scraper 70 and the vertical plane of the axle of the roller 68 when the parts are in their working positions. The scraper 70 is, therefore, adapted to run in the trench preceding the trench in which the roller 68 is traveling and will lift from the trench any stones or small clods which may have fallen into the same so that the roller will have a clear road when it, in turn, enters the same trench. The front of the roller will, of course, engage the knoll 73 at the forward end of the trench just before the scraper 70 reaches the knoll at the forward end of its trench and when the roller impinges against the knoll 73, it will ride up on the same, as shown in Fig. 4, so that the beam 67 will be swung to exert a pull upon the shank 69 to swing the same upwardly and rearwardly and permit the scraper 70 to clear the corresponding knoll. When the beam 67 is rocked, as just described, an impulse is transmitted to the seed-dropping shaft to actuate the same. While the first row of hills is being planted, one indicating marker will be lowered and it will be caused to rotate and leave a knoll each time a hill is planted, the knolls being alined transversely of the line of travel of the machine. When the machine reaches the end of the field and starts on its return trip, the draft tongue is brought into position directly over the line of knolls and trenches which will then serve as a guide in steering the machine. The previously inactive marker is then lowered and the knocker 49 is shifted to an inoperative position, whereupon, as the machine is driven back across the field, the roller 68 will be caused to ride in the several trenches and over the successive knolls and operate the seed-dropping shaft. The result is that seeds will be dropped in line with the previously planted hills and a second line of trenches will be formed parallel with the first line of trenches.

As before stated, the beam 67 extends above the tongue 4. To the upper extremity of the beam is pivotally connected the front end of a link 74 which has its rear end pivoted to a rocking frame 75 which is supported on the front of the intermediate arches 6, said frame consisting of a pair of vertically disposed bars pivoted between their ends upon the support and connected in spaced relation at their ends by transverse bolts, as will be understood upon reference to the drawings. The link 74 is connected to the frame 75 below the fulcrum thereof by a removable pivot pin or bolt 76 and, to attain balance and resist twisting, the link is disposed midway between the sides of the frame 75 and the pivot for its front end is carried by the upper extremity of the beam 67 and by a rocking support 77 which corresponds in all essential respects to the upper portion of the beam but is disposed at the opposite side of the tongue, the beam and the arm being secured to the tongue by the same pivot bolt 78. While the first row of hills is being planted, there are no trenches in which the roller 68 may run, and the pivot pin 76 is, therefore, removed, permitting the link 74 to drop to and rest on the lower fastening bolt 79 and disconnecting the beam from the seed-dropping mechanism. As the roller 68, at this time, rides on the surface of the ground, it will be elevated and will hold the clearer blade 70 in its raised position.

When the planter is being moved to and from the field, the plows or shoes 3 are raised several inches above the ground and the actuating beam 67 tends to trail along the ground. To avoid this condition, I provide the supporting bracket 80 consisting of a bar secured on the tongue in advance of the beam and having a longitudinal slot 81 in its rear end, the beam being provided with a pin or bolt 82 playing in the slot. When the shoes 3 are raised, the member 67 will merely swing until the pin 82 impinges against the end of the slot 81 and the beam will then rise to the same height as the shoes. When the device is operating, the bolt 82 plays to and fro in the slot 81. Secured at the rear of the rocker frame 75 is a bracket 83 which consists of a plate projecting upwardly and rearwardly and arranged to guide and support a plunger or knocker plug 84 which is pivoted to the frame 75 above the fulcrum thereof and extends rearwardly therefrom. Secured upon the rock shaft 50 in the path of the plunger 84 is a crank 85 whereby, when the plunger moves rearwardly, the shaft 50 will be rocked to release the clutch dog 52 and permit the seed-dropper shaft to be actuated. When the clutch dog is released, the crank 85 will have been pushed rearwardly to such a position that the plunger will ride over and beyond it and permit the rock shaft and the parts carried thereby to instantly return to normal position under the influence of the spring 53. It will be understood, of course, that when the roller 68 rides onto a knoll 73 the upper end of the actuator beam 67 swings forward and pulls the lower end of the frame 75 in the same direction, the upper end of the frame rocking rearward and actuating the plunger, as described.

When the planter was at work with the shoes or plows 3 in the ground, the driving chain 40 has, heretofore, been loose but when the shoes were raised from the ground the chain was tight. I have overcome this difficulty in a very simple manner. The shoes or plows 3 are raised and lowered by manipulation of the usual hand lever 86 which has an arm 87 at its lower end. Upon this arm I have secured a bolt 88 extending under the upper run of the chain and equipped with a roller 89. When the shoes are lowered, the lever stands upright and the arm 87 is approximately horizontal so that the roller engages and supports the upper run of the chain in a proper taut condition. When the lever is swung rearwardly to raise the shoes, the roller moves downwardly and releases the chain.

At 90 is indicated the usual gearing for operating mechanism to permit the proper number of grains to pass to the droppers. This is standard equipment and need not be removed when my invention is applied; it is only indicated in a general way with its details disregarded.

Having thus described the invention, I claim:

1. In a planter, means for forming a line of trenches separated by knolls, seed-dropping mechanism, a controlling device adapted to run in the line of trenches and over said knolls, means actuated by said device for operating the seed-dropping mechanism, and a clearer arranged to run in a trench in advance of the trench receiving the said controlling device for clearing the first-mentioned trench, said clearing device being operatively connected with the controlling device to be lifted from the trench prior to reaching a knoll at the end of the same.

2. In a planter provided with a tongue, means for forming a line of trenches separated by knolls, seed-dropping mechanism, a rocking beam supported on the tongue, a roller carried by the rear end of said beam to run in the line of trenches and over the knolls, a clearer adapted to run in a trench in advance of the trench receiving the roller and comprising a shank pivoted to and depending from the tongue, an operative connection between said shank and the rocking beam, and means whereby the rocking beam will actuate the seed-dropping mechanism.

3. In a planter, the combination with a planter frame, of a marker shaft mounted on the rear end of the frame, markers connected to the ends of the marker shaft and each comprising a plurality of spokes, and plows carried by the free ends of the spokes, means to prevent rotation of the marker shaft, seed-dropping mechanism, and means controlled by the seed-dropping mechanism to release the last mentioned means and permit rotation of the marker shaft at intervals.

4. In a planter, the combination with a planter frame, of a marker shaft mounted at the rear end of the frame, a marker connected to the end of the shaft and comprising a plurality of spokes, and plows carried by the free ends of the spokes, a stop disk fixed upon the marker shaft, seed-dropping mechanism, a stop pin yieldably held in engagement with the stop disk, and means controlled by the seed-dropping mechanism for releasing said pin at intervals.

5. In a planter, the combination with the planter frame, of a marker shaft mounted at the rear end of the frame, a marker connected with the shaft and consisting of a plurality of spokes and plows carried by the free ends of the spokes, a stop disk secured upon the marker shaft and provided with shoulders across its periphery, a stop pin mounted in front of the stop disk, yieldable means for holding the pin normally in engagement with a shoulder on the stop disk, seed-dropping mechanism including a dropper shaft having a crank arm, and a connection between said crank arm and the stop pin whereby the stop pin will be withdrawn from the stop disk at intervals.

6. In a planter, the combination of a marker shaft, a stop disk secured upon the marker shaft and having shoulders formed across its periphery at intervals, a stop pin slidably mounted in front of the disk and normally engaging a shoulder thereon to prevent rotation of the disk and the marker shaft, a transverse lever fulcrumed between its ends and having its inner end pivoted to the front end of the stop pin, a spring acting on said lever to hold the pin normally in engagement with the disk, a dropper shaft, a crank thereon and a rod connecting said crank with the outer end of the lever whereby the pin will be withdrawn and the marker shaft permitted to rotate when seed is dropped.

7. In a planter, the combination of a dropper shaft, an operating shaft mounted above the dropper shaft, means for rotating the operating shaft at intervals, a disk on the operating shaft, a pin on the side of said disk, a crank on the dropper shaft, a rod rising from said crank, and an arm pivoted at one end and provided at its opposite end with a free leaf disposed in the path of the pin, the arm being secured to and extending across the upper end of the rod.

8. In a planter, the combination of a dropper shaft, an intermediate shaft operatively connected therewith, means for rotating the intermediate shaft, a rock shaft, means on the rock shaft to hold the intermediate shaft against rotation, a rocking beam at the front of the planter actuated by knolls on the ground, and means controlled by said beam to actuate the rock shaft and release the holding means.

9. In a planter, the combination of a dropper shaft, an intermediate shaft operatively connected therewith, means for rotating the intermediate shaft, a rock shaft, means on the rock shaft to hold the intermediate shaft against rotation, a rocking beam at the front of the planter actuated by knolls on the ground, a rocking frame on the planter frame, connections between the lower end of the rocking frame and said rocking beam, a crank on the rock shaft, and a plunger carried by the upper end of the rocking frame and arranged to impinge against said crank for actuating the rock shaft and releasing the holding means.

In testimony whereof I affix my signature.

RALPH W. DICKERSON. [L. S.]